United States Patent [19]
Mori et al.

[11] 3,742,026
[45] June 26, 1973

[54] STABILIZATION OF THERMALLY UNSTABLE DMT WITH BHET

[75] Inventors: Hiroshi Mori; Michio Yamamoto; Koshi Namie; Teruhisa Kimoto, all of Maisuyama, Japan

[73] Assignee: Teijin Hercules Chemical Company Limited, Tokyo, Japan

[22] Filed: Jan. 8, 1971

[21] Appl. No.: 105,071

[52] U.S. Cl............................................ 260/475 B
[51] Int. Cl............................................ C07c 69/82
[58] Field of Search ................... 260/475 B, 475 PR

[56] References Cited
UNITED STATES PATENTS
3,485,867  12/1969  Jackson........................... 260/475 B

*Primary Examiner*—Lorraine A. Weinberger
*Assistant Examiner*—E. Jane Skelly
*Attorney*—George H. Hopkins

[57] ABSTRACT

Disclosed is the stabilization of thermally unstable dimethyl terephthalate with a stabilizing quantity of bis(-β-hydroxyethyl)terephthalate.

3 Claims, No Drawings

STABILIZATION OF THERMALLY UNSTABLE DMT WITH BHET

This invention is in the chemical arts. It has to do with that branch of organic chemistry pertaining to alcohol esters of aromatic dicarboxylic acids.

Dimethyl terephthalate (DMT) is a well known normally solid chemical of commercial importance. It is used in large quantities in the production of polyesters from which fibers and the like are made.

Recently, it has become common practice to ship and store DMT in the molten state, that is, at temperatures above 140°C. In some instances, however, DMT is unstable to the extent that under such conditions its color tends to increase substantially. As a result, the polyester made from it is off-color and sometimes has a degree of polymerization lower than that which is desired. The problem to which this invention provides a solution is how to stabilize thermally unstable DMT.

In summary, this invention comprises a thermally stable composition consisting essentially of thermally unstable DMT and dispersed therein at a stabilizing concentration material (hereinafter referred to as stabilizing material) consisting essentially of bis($\beta$-hydroxyethyl)terephthalate (BHET).

BHET is an intermediate formed in the production of highly polymeric polyesters from DMT and ethylene glycol. In the process generally employed for such production, ester exchange reaction of DMT and ethylene glycol is effected with a catalyst to give a reaction mixture consisting essentially of BHET. Methanol formed in the reaction usually volatilizes from the reaction mixture and normally is recovered. The reaction mixture thus obtained generally not only comprises BHET as its predominant component, but also, catalyst and one or more condensates of BHET, such as the dimer, trimer, tetramer, and the like of BHET. This reaction mixture is hereinafter referred to as DGT. Subsequently, DGT is subjected to a condensation reaction to form the highly polymeric polyester, which reaction, depending on the catalyst employed in the reaction of DMT with ethylene glycol, is effected either with that catalyst or another catalyst.

In one embodiment of this invention the stabilizing material comprises BHET alone.

In another embodiment of this invention the stabilizing material comprises DGT.

In still another embodiment of this invention, the stabilizing material comprises DGT plus one or more stabilizers for the ultimate polyester, which stabilizer or stabilizers are at a total concentration usually less than 10 percent by weight of the DGT.

Concentration of the stabilizing material in the thermally stabilized DMT of this invention is in a wide range. However, satisfactory results are obtained when the concentration of the stabilizing material is substantially 0.1–5 percent by weight of the thermally unstable DMT.

The composition of this invention is made several ways.

In one procedure it is made by admixing the stabilizing material alone or with other additives with the thermally unstable DMT in the molten state. This admixing can be performed by adding the stabilizing material while stirring the molten DMT. It also can be done by blowing with an inert gas the stabilizing material into the molten DMT. The resulting molten composition can be maintained in the molten state until it is used, or it can be cooled until solid.

In another procedure the composition of this invention is made by admixing the stabilizing material alone or with other additives with the thermally unstable DMT in the finely divided solid state. At the same time the stabilizing material can be in the finely divided solid state, the molten state or dissolved in an inert solvent which, subsequently, if desired, is removed by evaporation. Thereafter, when the DMT is melted for use, the stabilizing material automatically is incorporated in it.

In still another procedure the composition of this invention is made by admixing the stabilizing material alone or with other additives with a solution of the thermally unstable DMT in a solvent preferably for both the DMT and the stabilizing material. Preferably, the stabilizing material when added to the solution is dissolved either in a mutual solvent or the same solvent. After the stabilizing material has been dispersed in the solution of DMT, the solvent is removed by evaporation, or crystallization of the DMT is effected. In either case the solid DMT has incorporated in it the stabilizing material of this invention.

In yet another procedure the stabilizing material is admixed with molten DMT so that the concentration of the stabilizing material is substantially higher than the ultimate use concentration. A stabilizing quantity of the concentrate thus formed is subsequently added to the DMT to be stabilized.

The efficacy of the stabilizing material of this invention in stabilizing thermally unstable DMT is demonstrated by the following tabulated data obtained on samples of specific embodiments of the thermally stabilized DMT of this invention. The data were obtained by measuring the initial color of samples of thermally unstable DMT alone and with the indicated additives at the noted concentrations in parts by weight per million parts by weight of DMT. The samples were then established and maintained at 175°C. for 24 hours. The color of each sample was measured 4 hours, 10 hours and 24 hours after establishing the sample at 175°C.

TABLE I

| Additive | Concentration (% by wt. of DMT) | Color (Hazen Units) | | | |
|---|---|---|---|---|---|
| | | Initial | 4 hr. | 10 hr. | 24 hr. |
| None | — | 5 | 20 | 40 | 120 |
| BHET | 0.03 | 5 | 15 | 35 | 90 |
| " | 0.1 | 5 | 10 | 25 | 80 |
| " | 0.3 | 5 | 10 | 25 | 50 |
| " | 1 | 5 | 10 | 10 | 30 |
| " | 3 | 5 | 5 | 10 | 15 |
| None | — | 5 | 25 | 50 | 120 |
| DGT | 0.03 | 5 | 10 | 25 | 90 |
| " | 0.1 | 5 | 5 | 15 | 40 |
| " | 0.3 | 5 | 10 | 10 | 20 |
| " | 1 | 5 | 5 | 10 | 15 |

The foregoing data demonstrate that the thermally induced increase in coloring of thermally unstable DMT stabilized according to this invention is substantially lower than that of thermally unstable DMT without stabilizing material.

Thus, this invention provides a thermally stabilized DMT composition.

A feature of advantage of this invention is that the increase in color of DMT stabilized according to this invention, which increase is brought about by high temperatures at the time of storage or transfer or conversion of it into polyester, is substantially lower than that of unstabilized thermally unstable DMT. Consequently, polyester made from DMT stabilized according to this invention has substantially less color than polyester made from the thermally unstable DMT without stabilizing material.

Another feature of advantage of this invention is that when the stabilized DMT of this invention is used in the production of polyesters the possibility of the stabilizing material adversely affecting one or both of the polyester production reactions and the ultimate polyester product is minimized, if not eliminated, because the stabilizing material itself is an intermediate or intermediate product in the production of the polyester.

Other features, advantages and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The language "consisting essentially of" as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

The embodiments of the invention in which an exclusive property or privilege is claimed are defined as follows:

1. A thermally stable composition consisting essentially of thermally unstable DMT and dispersed therein at a stabilizing concentration material consisting essentially of BHET.

2. A thermally stable composition consisting essentially of thermally unstable DMT and dispersed therein, at about 0.1–5 percent by weight of the thermally unstable DMT, material consisting essentially of BHET.

3. A thermally stable composition consisting essentially of thermally unstable DMT and dispersed therein, at about 0.1–5 percent by weight of the thermally unstable DMT, material consisting essentially of DMT and ethylene glycol ester exchange reaction mixture.

* * * * *